United States Patent
Buker (10) Patent No.: US 9,683,106 B2
(45) Date of Patent: Jun. 20, 2017

(54) DEGRADABLE POLYMERS

(75) Inventor: Nicholas D. Buker, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 327 days.

(21) Appl. No.: 13/816,702

(22) PCT Filed: Mar. 30, 2012

(86) PCT No.: PCT/US2012/031627
§ 371 (c)(1),
(2), (4) Date: Feb. 12, 2013

(87) PCT Pub. No.: WO2013/147876
PCT Pub. Date: Oct. 3, 2013

(65) Prior Publication Data
US 2014/0004349 A1    Jan. 2, 2014

(51) Int. Cl.
*B32B 9/04* (2006.01)
*C09D 5/00* (2006.01)
*B29B 17/02* (2006.01)
*C08J 11/06* (2006.01)
(Continued)

(52) U.S. Cl.
CPC ............... *C09D 5/00* (2013.01); *B29B 17/02* (2013.01); *C08J 11/06* (2013.01); *B29B 17/0412* (2013.01); *B29B 2017/0203* (2013.01); *B29B 2017/0293* (2013.01); *B29L 2009/005* (2013.01); *Y02P 20/582* (2015.11); *Y02W 30/622* (2015.05); *Y02W 30/625* (2015.05); *Y10T 428/3154* (2015.04); *Y10T 428/31504* (2015.04); *Y10T 428/31507* (2015.04); *Y10T 428/31533* (2015.04); *Y10T 428/31544* (2015.04); *Y10T 428/31551* (2015.04); *Y10T 428/31721* (2015.04); *Y10T 428/31725* (2015.04); *Y10T 428/31739* (2015.04); *Y10T 428/31786* (2015.04); *Y10T 428/31931* (2015.04); *Y10T 428/31935* (2015.04); *Y10T 428/31938* (2015.04); *Y10T 428/31971* (2015.04)

(58) Field of Classification Search
None
See application file for complete search history.

(56) References Cited

U.S. PATENT DOCUMENTS

| 4,789,724 A | * | 12/1988 | Domb et al. ............... 528/176 |
| 5,270,419 A | | 12/1993 | Domb |
| 5,534,556 A | | 7/1996 | Bauer |

(Continued)

FOREIGN PATENT DOCUMENTS

| EP | 0 922 501 | 6/1999 |
| JP | 2002-256442 | 9/2002 |

(Continued)

OTHER PUBLICATIONS

Shigemori, JP20100083942 Abstract, Machine translation. Apr. 15, 2010.*

(Continued)

*Primary Examiner* — Coris Fung
(74) *Attorney, Agent, or Firm* — Dorsey & Whitney LLP (57) ABSTRACT

Some embodiments provided herein relate to a thermoplastic material that can include a thermoplastic surface, a protective coating, and a degradable intermediate layer.

11 Claims, 2 Drawing Sheets

(51) Int. Cl.
  *B29L 9/00* (2006.01)
  *B29B 17/04* (2006.01)

(56) References Cited

U.S. PATENT DOCUMENTS

| | | | |
|---|---|---|---|
| 5,562,275 | A | 10/1996 | Weissenfluh et al. |
| 5,817,183 | A | 10/1998 | Eddy-Helenek et al. |
| 6,610,758 | B2 | 8/2003 | Suzuki |
| 6,958,127 | B1 | 10/2005 | Suzuki et al. |
| 7,699,248 | B2 | 4/2010 | Moriwaki et al. |
| 2002/0189642 | A1 | 12/2002 | Sapienza et al. |
| 2004/0215313 | A1* | 10/2004 | Cheng .................. 623/1.11 |
| 2005/0266077 | A1* | 12/2005 | Royer .................. 424/469 |
| 2006/0194010 | A1 | 8/2006 | Hiscock |
| 2007/0004856 | A1 | 1/2007 | Mazanek et al. |
| 2008/0210120 | A1 | 9/2008 | Foukes et al. |
| 2008/0227940 | A1* | 9/2008 | Wilson .............. C08F 210/02 526/266 |
| 2010/0009208 | A1* | 1/2010 | Lee .................. 428/483 |
| 2010/0143647 | A1* | 6/2010 | Tonniessen .......... B65C 9/20 428/137 |
| 2010/0196277 | A1* | 8/2010 | DeSimone et al. ......... 424/9.1 |
| 2011/0104602 | A1 | 5/2011 | Yu et al. |
| 2011/0277653 | A1* | 11/2011 | Nguyen .............. B41N 1/08 101/453 |

FOREIGN PATENT DOCUMENTS

| | | | |
|---|---|---|---|
| JP | 2010083942 | * | 4/2010 |
| WO | WO 99/58328 | | 11/1999 |
| WO | WO 2011/059625 | | 5/2011 |
| WO | WO 2011/130855 | | 10/2011 |

OTHER PUBLICATIONS

AS4000™ and AS4700™ Technical Data Sheet From Momentive Performance Materials, Waterford, NY, http://www.momentive.com.

Bauer, "Interpreting Weathering Acceleration Factors for Automotive Coatings Using Exposure Models," Polymer Degradation and Stability, 2000, p. 315-316, vol. 69.

Bingham, "What's in a Name?" Automotive Industries, ai-online.com, May 2001, p. 31-34, vol. 181 (5).

Directive 2000/53/EC of the European Parliament and of the Council of Sep. 18, 2000 on end-of life vehicles, Official Journal of the European Union, L170, p. 81 Jun. 29, 2002.

Directive 2002/96/EC of the European Parliament and of the Council of Jan. 27, 2003 on waste electrical and electronic equipment (WEEE), Official Journal of the European Union, L 345 106, p. 106.

Fremon, "Static Control Methods in Plastics Decorating to Reduce Rejection Rates and Increase Production Efficiency," Conference Proceedings at ANTEC '98. Published by CRC Press, Apr. 26-Apr. 30, 1998, ISBN 1566766699, p. 2662.

International Search Report and Written Opinion received in International Application No. PCT/US2012/031627, dated May 10, 2012, filed on Mar. 30, 2012.

Kang, et al., "Electronic Waste Recycling: A Review of U.S. Infrastructure and Technology Options," Resources, Conservation and Recycling, 2005, p. 368-400, vol. 45.

Kumar et al., "Polyanhydrides: An Overview," Advanced Drug Delivery Reviews, 2002, pp. 889-910, vol. 54.

McGinniss, "Advances in Environmentally Benign Coatings and Adhesives," Progress in Organic Coatings, 1996, pp. 153-161, vol. 27.

New report reveals two million vehicles scrapped, 80 per cent recycled. SMMT Driving the Motor Industry, https://www.smmt.co.uk/2002/02/new-report-reveals-two-million-vehicles-scrapped-80-per-cent-recycled/; posted Feb. 25, 2002.

New report reveals two million vehicles scrapped, 80 per cent recycled. Table of data from 2001 ACORD report. http://www.smmt.co.uk/wp-content/uploads/articles/news/News/ACF105D.pdf.

Plastics recycling information sheet. Retrieved Feb. 1, 2009, from Waste Watch Environmental Charity Web Site: http://wasteonline.org.uk/resources/InformationSheets/Plastics.htm.

Thermoplastic—from Wikipedia; http://en.wikipedia.org/wiki/Thermoplastic.

VelvaShield® coating line from DuPont, Wilmingon, DE, http://www.dupont.com, © 2010.

VT152TM and UVT610M from Red Spot Paint and Varnish, Evanville, IN, http://www.redspot.com.

Waste Watch, Plastics in the UK economy, a guide to polymer use and the opportunities for recycling, Waste Watch & Recoup. 2, 96 Tooley St, London, SE1 2TH020, 7089, © 2003.

Weernink, W., "Plastic glazing gains on lower weight, design freedom," Automotive News Europe. Sep. 3, 2007, 12, 18, p. 13.

* cited by examiner

DEGRADABLE POLYMERS

CROSS-REFERENCE TO RELATED APPLICATIONS

The present application is a U.S. national stage filing under 35 U.S.C. § 371 of International Application No. PCT/US2012/031627, filed on Mar. 30, 2012.

TECHNICAL FIELD

Some embodiments provided herein relate generally to compositions and/or layers that can include a removable coating.

BACKGROUND

In some situations, thermoplastic devices are coated with a protective coating to provide protection to the underlying thermoplastic structure. Such coatings are often protective in nature and permanently adhered to the thermoplastic structure. In some situations, thermoplastic devices are coated with other coatings that can provide some aspect or characteristic to the thermoplastic structure.

SUMMARY

In some embodiments, a thermoplastic material is provided. In some embodiments, the thermoplastic material includes a thermoplastic surface, a protective outer coating and a degradable intermediate layer. In some embodiments, the degradable intermediate layer associates the protective coating with the thermoplastic surface.

In some embodiments, a method of processing a thermoplastic material is provided. In some embodiments, the method of processing the thermoplastic can include providing a thermoplastic material. The thermoplastic material can have a thermoplastic surface, a protective outer coating, and a degradable intermediate layer. The method of process the thermoplastic can further include breaching the protective outer coating to expose a degradable intermediate layer and removing and/or dissolving the degradable intermediate layer. In some embodiments, removing the degradable intermediate layer removes the protective outer coating, thereby allowing for the processing the thermoplastic material.

In some embodiments, a method of protecting a thermoplastic surface is provided. The method can include providing a protective coating over a thermoplastic surface. In some embodiments, the protective coating is adhered to the thermoplastic surface by a degradable intermediate layer.

In some embodiments, a method of making a protective coating for a thermoplastic material is provided. In some embodiments, the method can include providing a thermoplastic material having a thermoplastic surface, applying a degradable layer over the thermoplastic layer, and applying a protective coating over the degradable layer, thereby making a protective coating for a thermoplastic material.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Provided herein are various compositions, materials, and methods relating to coatings associated with thermoplastic materials. Some embodiments relate to removing and/or changing a layer or coating over a thermoplastic material and/or other material. In some embodiments, this can involve an intermediate layer that can be removable. In some embodiments, the intermediate layer can allow the coating to be separated from the thermoplastic material and/or surface by the removal of the intermediate layer itself (such as by dissolving the intermediate layer), thereby allowing for an efficient separation of the thermoplastic material from the coating. While not limited to such applications, in some embodiments, the degradable intermediate layer can allow for ease of recycling of various thermoplastic materials and/or changing various coatings on top of a thermoplastic material by making the removal of an outer coating easier.

In some embodiments, a thermoplastic material includes a thermoplastic surface, a coating and an intermediate layer. In some embodiments, the intermediate layer associates the coating (either directly or indirectly) with the thermoplastic surface. In some embodiments, the intermediate layer is degradable. In some embodiments, the degradable intermediate layer allows the coating to be removed from the thermoplastic surface by the ready degradation of the intermediate layer.

Figure 1:
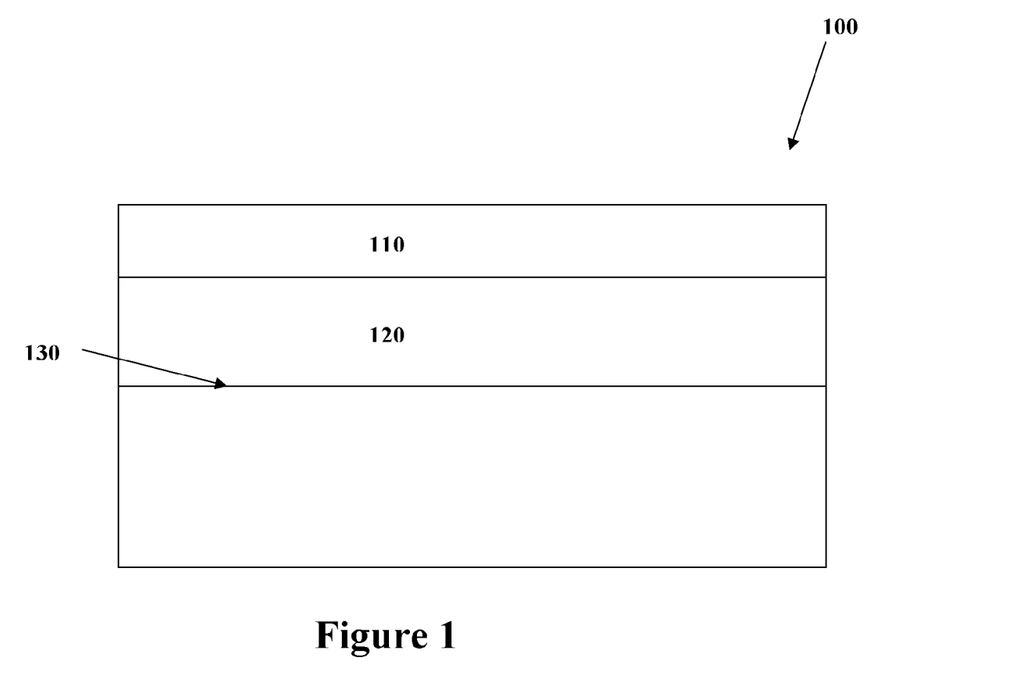
FIG. 1 is a drawing depicting some embodiments of an arrangement of a thermoplastic material that includes an intermediate layer.

FIG. 1 depicts some embodiments of a thermoplastic material. As shown in FIG. 1, the thermoplastic material 100 can include a coating 110 over a thermoplastic surface 130. In some embodiments, an intermediate layer 120 can be between the coating 110 and the thermoplastic surface 130. In some embodiments, while the intermediate layer can be degraded and/or broken down, so as to allow separation of the coating and the thermoplastic surface, the intermediate layer can be protected from degradation and/or break down by the presence of the coating (or other layer). Thus, in some embodiments, the breakdown of the intermediate layer can occur after a breach in the coating occurs. In some embodiments, this allows the intermediate layer to effectively keep the coating associated with the thermoplastic layer as desired, but allows one to more readily (and/or completely) remove the coating from the thermoplastic layer by breaching the coating and applying an agent (through the breached coating) to the degradable intermediate layer. The agent can then degrade the intermediate layer, allowing for separation of the coating and the thermoplastic surface. In some embodiments, prior to the breach in the coating (or other protective layer), the agent does not significantly cause degradation of the intermediate layer, due to the presence of the coating (or other protective layer).

In some embodiments, the intermediate layer 120 associates and/or adheres the coating 110 to the thermoplastic surface 130 directly and/or indirectly. In some embodiments, the intermediate layer 120 is configured to adhere to the coating 110. In some embodiments, the intermediate layer 120 is configured to adhere to the thermoplastic surface. In some embodiments, the intermediate layer 120 is configured to adhere to the coating 110 and the thermoplastic surface. In some embodiments, the intermediate layer 120 adheres the coating 110 directly to the thermoplastic surface 130.

In some embodiments, the intermediate layer is located between the coating and the thermoplastic surface. In some embodiments, the intermediate layer can be above, below, have a common end point, and/or have a common border with the coating and/or the thermoplastic surface. In some embodiments, the intermediate layer is adjacent to the coating. In some embodiments, the intermediate layer is adjacent to the thermoplastic surface. In some embodiments, the intermediate layer contacts the coating and/or thermoplastic surface. In some embodiments, the intermediate layer adjoins, is contiguous with, or is juxtaposed to the coating and/or the thermoplastic surface. In some embodiments, the intermediate layer is in close proximity to but does not contact the coating and/or thermoplastic surface. In some embodiments, the coating is adjacent to the intermediate layer and the intermediate layer is adjacent to the thermoplastic surface.

In some embodiments, two or more intermediate layers 120 can be located between the coating 110 and the thermoplastic surface 130, e.g., 2, 3, 4, 5, 6, 7, 8, 9, 10, 20, 30, 40 or more layers, including any range above any one of the preceding values and any range defined between any two of the preceding values. In some embodiments, the second intermediate layer can be the same or substantially the same as the first intermediate layer. In some embodiments, the second intermediate layer can have the same composition as the first intermediate layer. In some embodiments, the second intermediate layer can have a different composition than the first intermediate layer. In some embodiments, the first and second intermediate layers can have different degradation rates. In some embodiments, the first intermediate layer has an interface with the second intermediate layer.

In some embodiments, beneath a first intermediate layer, there is a second or more coating. Thus, in some embodiments, one can breach a first coating, degrade the first intermediate layer, and thereby expose a second or subsequent coating, before getting to the thermoplastic surface. Thus, in some embodiments, multiple coatings can be present, one or more of which can be separated by an intermediate layer, such that by specifically breaching a coating and applying an agent to degrade the intermediate layer directly beneath it, one can remove a first coating and at least partially expose a second or subsequent coating. In some embodiments, there are 1, 2, 3, 4, 5, 6, 7, 8, 9, 10, 15, 20, 25, 30, 40, 50, or 100 coatings, including any range defined between any two of the preceding values and any range above any one of the preceding values.

In some embodiments, the thermoplastic material 100 can include one or more intervening layers (e.g., 1, 5, 10, 15, 20, 30, 40, 50, or 100 layers, including any range defined between any two of the preceding values and any range above any one of the preceding values), which can be in addition to the coating 110, thermoplastic surface 130 and/or intermediate layer 120. In some embodiments, the intervening layer can be between the intermediate layer 120 and the thermoplastic surface 130. In some embodiments, the intervening layer can be between the intermediate layer 120 and the coating 110. In some embodiments, the intervening layer can be any layer not disclosed herein.

In some embodiments, a coating is provided to protect against damage from UV light, reduce degradation by oxygen, change the texture and/or alter the color. In some embodiments, a primer or an adhesive is provided. In some embodiments, the coatings are used to enhance scratch resistance, for lubrication/friction-reduction, to increase resistance to a particular chemical for specialized application, to generate a compatible interface with another material, and/or to make the polymer surface hydrophilic/hydrophobic. In some embodiments, the coatings are also used as flame retardants and to increase impact resistance. In some embodiments, the coating can include one or more of a halogenated polymer and/or monomer (including, for example, those with fluorine, chlorine and/or bromine), dyes and/or pigments, minerals (such as, for example, silica, zirconia, titania, metal hydroxide and/or borates), polyolefins (such as, for example, polypropylene), acrylates (such as, for example, methacrylate and/or poly(methyl methacrylate)); and silicones and/or siloxanes.

In some embodiments, the thermoplastic material can include two or more thermoplastic surfaces (e.g., 1, 5, 10, 15, 20, 30, 40, 50, or 100 thermoplastic surfaces, including any range defined between any two of the preceding values and any range above any one of the preceding values). In some embodiments, the intervening layers, coatings and thermoplastic surfaces can be arranged in various configurations such that one or more intermediate layer is between each coating and thermoplastic surface.

In some embodiments, the intermediate layer can be anything that can be broken down adequately so that a layer and/or coating on the intermediate layer can be separated from the thermoplastic surface (or other layer or surface associated with the thermoplastic surface). In some embodiments, the intermediate layer can be anything that can be removed adequately so that a layer and/or coating on the intermediate layer can be separated from the thermoplastic surface (or other layer or surface associated with the thermoplastic surface). In some embodiments, the intermediate layer can be configured to degrade, dissolve, liquefy, erode, depolymerize, and/or generally be separated, etc. In some embodiments, the intermediate layer is degradable. In some embodiments, the intermediate layer can be configured to degrade by dissolution, chemical reaction, and/or thermally. In some embodiments, at least some of the intermediate layer is dissolved and/or dissolvable, for example, 1, 5, 10, 15, 20, 25, 30, 35, 40, 45, 50, 55, 60, 65, 70, 75, 80, 85, 90, 95, 96, 97, 98, 99, 99.9, 99.99, or all of the intermediate layer is dissolved and/or dissolvable, including any range between any two of the preceding values and any range above any one of the preceding values.

In some embodiments, the intermediate layer can be completely and/or nearly completely removable from the thermoplastic surface (or other layer or surface associated with the thermoplastic surface). In some embodiments, the intermediately layer need only be removable enough so that the outer coating can be separated from the thermoplastic surface (or other layer or surface associated with the thermoplastic surface). In some embodiments, some of the intermediate layer remains adhered to the thermoplastic surface (or other layer or surface associated with the thermoplastic surface). In some embodiments, the remaining intermediate layer can be removed after, or, alternatively, covered by a new intermediate layer.

In some embodiments, the intermediate layer can be completely and/or nearly completely removable from the coating (or other layer or surface associated with the coating). In some embodiments, the intermediately layer need only be removable enough so that the coating can be separated from the thermoplastic surface. In some embodiments, some of the intermediate layer remains adhered to the coating.

While a variety of compositions can be used, in some embodiments, the intermediate layer can be a degradable material. In some embodiments, the degradable material is anything capable of maintaining mechanical integrity until degraded, and capable of controlled rates of degradation. In some embodiments, the degradable material is a soluble material. In some embodiments, the soluble material can be degraded in a solution, water surfactant solution, or organic solvent. In some embodiments, the degradable material is not water soluble. In some embodiments, the degradable material is insoluble but can be dissolved. In some embodiments, the degradable material can be depolymerized.

In some embodiments, the intermediate layer includes one or more oligomers and/or polymers. In some embodiments, the intermediate layer includes a copolymer of two or more polymers and/or oligomers.

In some embodiments, the polymer can be a biodegradable polymer. In some embodiments, the biodegradable polymer can include, but is not limited to, 1. 3-hydroxypropionic acid, P(3-HP), polylactic acid, poly(esters) based on polylactide (PLA), polyglycolide (PGA), polycaprolactone (PCL), polyhydroxybutyrate (PHB), polyhydroxyvalerate (PHV) and their copolymers.

In some embodiments, the polymer can include an anhydride linkage. In some embodiments, the polymer can include a polyanhydride. In some embodiments, the polyanhydride can include, but is not limited to, polypropylene, polycarbonate, poly(methyl methacrylate) (PMMA), copolymer of terephthalic acid and oxalic acid, polydimethylmalonic anhydride, polymer of terephthalic acid.

In some embodiments, the polyanhydride can be, as seen in Formula I:

Formula I wherein n can be 1 to 100,000.

Figure 2:
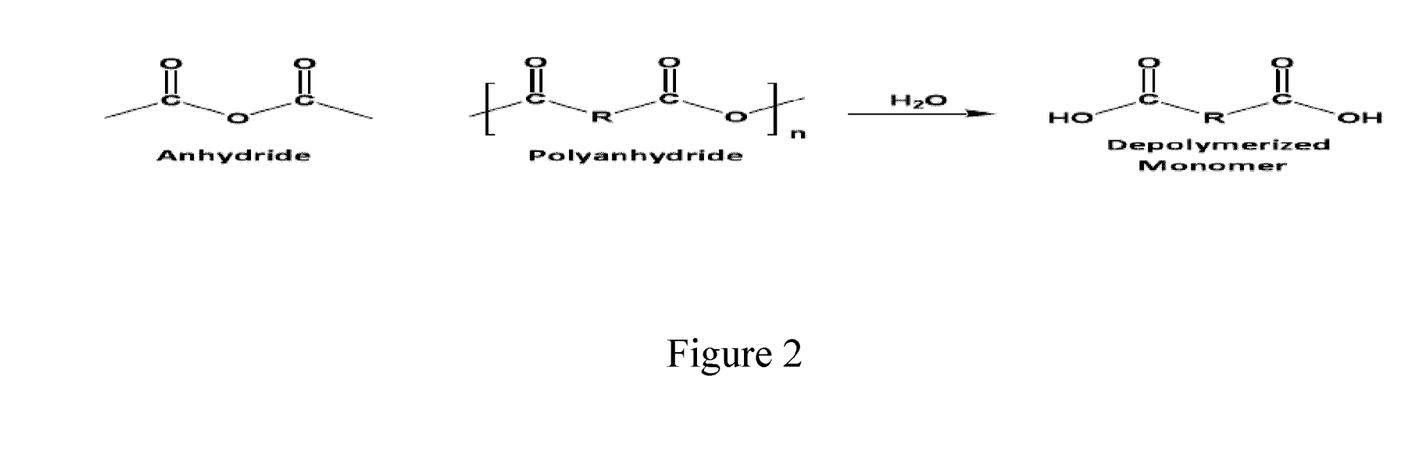
FIG. 2 is a drawing depicting a reaction of the conversion of a polyanhydride to a depolymerized monomer in the presence of water for some of the present embodiments.

In some embodiments, the anhydride linkage (as represented by R in Formula I) can be an aliphatic, substituted aliphatic, aromatic, substituted aromatic or silicon-containing group. In some embodiments, the polyanhydride is unsaturated. In some embodiments, an aliphatic R group (which can be carbons in a straight or branched arrangement) can have lower melting points (about 50 to 100 degrees Centigrade), relatively high solubilities in common solvents and a comparatively swift reaction with water (e.g., converting the polyanhydride to depolymerized water, as shown in FIG. 2. In some embodiments, polyanhydrides with aromatic R groups can have a higher melting point (greater than 100 degrees Centigrade), lower solubilities, and slower reactions with water.

In some embodiments, the aliphatic group can be a straight or branched chain carbon group. In some embodiments, the aliphatic group is selected from the group of: a $C_{1-10}$ alkane, a $C_{1-10}$ alkene, a $C_{1-10}$ alkyne, a $C_{3-10}$ cycloalkyl, or combinations thereof. In some embodiments, the aliphatic polyanhydride is soluble in an organic solvent.

In some embodiments, the aromatic group is selected from the group of: a benzene, a heteroarene, a derivative thereof, or any combinations thereof. In some embodiments, the aromatic group is insoluble in organic solvents.

In some embodiments, the polymer is a copolymer of an aliphatic polyanhydride and aromatic polyanhydride. In some embodiments, the polymers of the copolymer are selected to achieve a desired degradation rate. In some embodiments, the degradation rate of the copolymer can be selected based on the solubility and/or melting point of the polymers. In some embodiments, the intermediate layer 120 includes a polyanhydride of Formula I, wherein R is an aliphatic group and a polyanhydride of Formula I, wherein R is an aromatic group.

In some embodiments, the length of the polymer and/or oligomer can vary. In some embodiments, the length of the polymer can be a number of repeating units or monomers (as represented by n in Formula I). In some embodiments, the number of repeating units can be from about 1 to about 100,000, e.g. 1, 100, 500, 1000, 2000, 3000, 4000, 5000, 6000, 7000, 8000, 9000, 10000, 20000, 30000, 40000, 50000, 75000, 100000, including any range below any of the preceding values, any range above any of the preceding values, and any range between any two of the preceding values. In some embodiments, the length of the oligomer can be about 2 to about 10 repeating units or monomers.

In some embodiments, the monomer can include a dicarboxylic acid. In some embodiments, dicarboxylic acids, e.g., glutaric acid, adipic acid, benzene dicarboxylic acid (terephthalic acid), phenylated succinic acid and methylated malonic acid, can be used to form one or more anhydride polymer.

It will be appreciated by the disclosure herein, that in some embodiments the moisture sensitivity of polyanhydrides can make the polyanhydride a relevant selection for some embodiments. It will be further appreciated from the disclosure herein that a wide range of polyanhydrides with varying properties can be generated. In some embodiments, polyanhydrides can be produced by heating dicarboxylic monomers in acetic anhydride under reduced pressure. In some embodiments, the dicarboxylic acid monomers can be and/or include oxalic acid, malonic acid, succinic acid, glutaric acid, adipic acid, pimelic acid, terephthalic acid, phenyl succinic acid, and/or dimethyl malonic acid. In some embodiments, the polyanhydride employed can be one that is compatible with polymers such as polypropylene, polymethyl methacrylate (PMMA), and/or acrylonitrile butadiene styrene (ABS).

In some embodiments, glutaric acid, adipic acid, benzene dicarboxylic acid (terephthalic acid), phenylated succinic acid and/or methylated malonic acid can be used as or included in the intermediate layer. In some embodiments, these and/or others can be used without and/or with a reduced risk of causing harm to the thermoplastic surfaces.

In some embodiments, the polymer can be selected for a desired degradation rate. In some embodiments, the degradation rate of a polymer can be selected by adjusting the melting point of the polymer. Increasing or decreasing the length of the chain can raise or lower the melting point of the polymer, respectively. It will be further appreciated that incorporating structures such as aromatic rings or elements such as nitrogen or oxygen into the main chain or side groups can result in higher melting points. While not being limiting, it will be appreciated that aliphatic polymers, such as polyethylene, (based upon chains of carbon and hydrogen) can have lower melting points.

In some embodiments, the intermediate layer includes a polymer that depolymerizes in the presence of a solution or a water surfactant solution.

In some embodiments, the coating of the thermoplastic material enhances certain characteristics of the thermoplastic surface. In some embodiments, the coating is configured to enhance the UV or oxygen stability, texture, color or durability of the thermoplastic coating. In some embodiments, the coating can be a protective coating. In some embodiments, the coating is over the thermoplastic surface. In some embodiments, the coating is an outer coating. In some embodiments, the coating is an outer-most coating.

In some embodiment, the coating is practically insoluble in water and/or an organic solvent. In some embodiment, the material of the coating can be substantially insoluble in a solution or water surfactant. In some embodiments, the material of the coating can be poorly soluble. In some embodiments, the coating is effectively insoluble in a solution or a water surfactant solution. In some embodiments, the coating is adequately insoluble so as to prevent and/or reduce a solvent from coming into contact with the intermediate layer, when the coating is not physically breached. In some embodiments, the coating can achieve this for at least 0.1 days, e.g., 0.1, 1, 10, 20, 30, 40, 50, 100, 300, 365, 1000, 2000, 3000, 5000, or 10,000 days, including any range above any one of the preceding values and ay range between any two of the preceding values. In some embodiments, the coating is relatively insoluble to a solvent that would degrade the intermediate layer. In some embodiments, the coating is effectively insoluble to a solvent that would degrade the intermediate layer. In some embodiments, the coating is insoluble to a solvent that would degrade the intermediate layer. In some embodiments, the coating 110 can include (and/or be adjacent to) a thin film or paint, or other layer.

In some embodiments, the thermoplastic surface can be made of or include, but is not limited to acrylonitrile butadiene styrene (ABS), acrylic (PMMA), celluloid, cellulose acetate, cyclic olefin copolymer (COC), ethylene-vinyl acetate (EVA), ethylene vinyl alcohol (EVOH), efluoroplastics (PTFE, alongside with FEP, PFA, CTFE, ECTFE, ETFE), ionomers, kydex, a trademarked acrylic/PVC alloy, liquid crystal polymer (LCP), polyoxymethylene (POM or acetal), polyacrylates (Acrylic), polyacrylonitrile (PAN or acrylonitrile), polyamide (PA or Nylon), polyamide-imide (PAI), polyaryletherketone (PAEK or Ketone), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), styrene-acrylonitrile (SAN) and combinations thereof. In some embodiments, the thermoplastic surface can include one or more of polypropylene, ethylene, silicone and/or acrylic. In some embodiments, the thermoplastic surface can be and/or include polypropylene, PMMA, polycarbonate, a copolymer of terephthalic acid and oxalic acid, polydimethylmalonic anhydride, and/or a polymer of terephthalic acid.

In some embodiments, a method of removing a coating 110 from a thermoplastic surface 130 is provided. In some embodiments, the method includes providing a thermoplastic material 100, breaching a coating 110, and at least partially removing an intermediate layer 120. This can be done by applying an agent, through the breach in the coating, to the intermediate layer. This can allow one to thereby remove the coating 110 from the thermoplastic surface 130. In some embodiments, the intermediate layer is a degradable intermediate layer that associates the protective coating with the thermoplastic surface. In some embodiments, breaching the protective outer coating 110 exposes the degradable intermediate layer 120.

In some embodiments, any of the various embodiments including at least one intermediate layer can be used in any of the methods provided herein. In some embodiments, removing the intermediate layer can include degrading, dissolving, and/or eroding the intermediate layer. In some embodiments, removing the degradable intermediate layer includes dissolving the degradable intermediate layer. In some embodiments, removing the degradable intermediate layer includes depolymerizing the intermediate layer. As noted above, "removal" of the intermediate layer does not require the complete removal of the layer in all embodiments, and encompasses anything from complete removal, to adequate removal to allow for separation of at least part of the thermoplastic surface from at least part of the coating.

In some embodiments, a solvent can be used to facilitate removing the intermediate layer. In some embodiments, the solvent can include a solution and/or a water surfactant. In some embodiments, the solution can include water. In some embodiments, the solvent can be an organic solvent. In some embodiments, the organic solvent can include, but is not limited to, ethyl acetate, tetrahydrofuran, or any combination thereof.

In some embodiments, heat can be used to remove the intermediate layer (and/or facilitate it). In some embodiments, various devices and techniques can be employed to facilitate removing the intermediate layer. In some embodiments, ultrasonic baths and/or water jets can be used to facilitate removing the intermediate layer. In some embodiments, various agents (such as a solvent and heat) can be combined for removal of the intermediate layer.

In some embodiments, exposing at least a portion of the intermediate layer can facilitate removing the intermediate layer. In some embodiments, dissolving includes exposing the degradable intermediate layer.

In some embodiments, removing the degradable intermediate layer includes exposing the degradable intermediate layer and depolymerizing the polyanhydride to form a depolymerized monomer.

In some embodiments, the coating 110 is breached to allow access to the intermediate layer 120. In some embodiments, breaching the coating 110 exposes at least a portion of the intermediate layer 120. In some embodiments, exposing more surface area of the intermediate layer 120 can allow for faster degradation of the intermediate layer 120.

In some embodiments, breaching can include breaking the thermoplastic material 100 into smaller pieces. In some embodiment, breaching can include shredding, chipping, crushing, and/or scoring the coating 110, the thermoplastic material 100, or both. In some embodiment, breaching can include shredding, chipping, crushing, and/or scoring the coating 110, the intermediate layer 120, and/or the thermoplastic material 100. In some embodiments, breaching can allow for ease of handling, transportation, and/or storage of the thermoplastic material 100.

In some embodiments, the method further includes reusing at least a part of the thermoplastic material 100 after the thermoplastic material 100 has been processed (e.g., reusing the thermoplastic). In some embodiments, the method further includes recycling the thermoplastic. In some embodiments, the thermoplastic surface 130 can be left intact or substantial intact during the process. In some embodiments, the method further includes recoating the thermoplastic surface 130 after the coating 110 has been removed.

In some embodiments, a method of protecting a thermoplastic surface 130 is provided. In some embodiments, the method can include providing a protective coating 110 over the thermoplastic surface 130. In some embodiments, the protective coating 110 can be adhered to the thermoplastic surface 130 by a degradable intermediate layer 120.

In some embodiments, a method for making a thermoplastic material 100 is provided. In some embodiments, the method can include providing a thermoplastic material 100 having a thermoplastic surface 130, applying an intermediate layer (e.g., a degradable layer) over the thermoplastic surface 130, and applying a protective coating 110 over the intermediate layer (e.g., the degradable layer), thereby making a protective coating 110 for a thermoplastic material 100.

In some embodiments, one or more intermediate layers (e.g., degradable layers) are applied over the thermoplastic surface 130. In some embodiments, the intermediate layer (e.g., the degradable layer) adheres to the thermoplastic surface 130. In some embodiments, the protective coating 110 adheres to the intermediate layer (e.g., a degradable layer). In some embodiments, additional adhesive layers and/or other layers can be applied between one or more the layers and/or coatings.

In some embodiments, the intermediate layer (e.g., the degradable layer) is applied as a pre-polymer. In some embodiments, the intermediate layer (e.g., the degradable layer) is applied as a solution in a solvent. In some embodiments, applying the intermediate layer includes applying a solution of a polyanhydride in a suitable solvent. In some embodiments, this can be followed by dipping or spraying of the intermediate coated thermoplastic material.

In some embodiments, a first intermediate layer (e.g., degradable layer) or part thereof can be applied to the thermoplastic surface. In some embodiments, a second intermediate layer (e.g., degradable layer) or part thereof can be applied to the protective coating 110. In some embodiments, the first intermediate layer can be polymerized by the presence of a material in the second intermediate layer, when the two come into contact with one another.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

In some embodiments, the thermoplastic surface can have any of a variety of shapes for any of a variety of purposes. In some embodiments, the thermoplastic material 100 can have its shape determined by the initial starting shape of the surface of the thermoplastic material 130 (which can be molded by any of a variety of techniques). In some embodiments, the thermoplastic material 100 can have its shape determined after the intermediate layer 120 and the coating 110 have been applied and the entire thermoplastic material 100 is reformed.

In some embodiments, the thermoplastic material provided herein can be part of vehicle part (such as an automotive or aircraft part, etc.), electrical part, electronic equipment, personal electronics, storage material and/or other device or part.

Example 1

Recycling a Coated Product

The present example outlines some embodiments for how to recycle a product with a coating.

A piece of a thermoplastic material is obtained from an automobile. The thermoplastic material includes a thermoplastic layer having a thermoplastic surface, coated by an ethanol degradable intermediate layer, which is coated by an ethanol resistant outer coating.

The material is placed into a chipper and chipped into pieces that are, on average, less than 10 cm across. The chipped product is then soaked in ethanol for five hours, separating the coating from the thermoplastic layer. The thermoplastic layer is then collected, dried and used as a starting material for recycling of the thermoplastic.

Example 2

Method of Applying a Protective Coating

The present example outlines an implementation for applying a protective coating to a thermoplastic material. A thermoplastic layer is provided. A polyanhydride is dissolved in an appropriate solvent and is sprayed onto the thermoplastic layer to form a polymer intermediate layer. A coating is spray applied over the intermediate layer. The coating is allowed to harden to form a water resistant coating, which, until breached, can reduce the likelihood that water will come into contact with the polyanhydride polymer layer.

Example 3

Removing and Reapplying a Coating

The present example outlines an implementation for recycling a thermoplastic material.

The product from Example 2 is provided. The water resistant coating is breached by gently scoring the outer coating, without excessively penetrating the intermediate layer. The scored product is then placed into a water bath and sonicated for 1 hour. The intermediate layer is dissolved and the outer coating removed. The thermoplastic layer is allowed to dry, a new intermediate layer is applied and a new coating is applied (as outlined in Example 2).

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting, with the true scope and spirit being indicated by the following claims.

What is claimed is:

1. A thermoplastic material, the thermoplastic material comprising:
    a thermoplastic surface;
    a protective outer coating that is insoluble in a solution or a water surfactant solution; and
    a degradable intermediate layer that associates the protective outer coating with the thermoplastic surface,
    wherein the degradable intermediate layer comprises a polymer that depolymerizes in the presence of the solution or the water surfactant solution, wherein the protective outer coating is insoluble in the solution or the water surfactant solution, thereby preventing degradation of the degradable intermediate layer, and wherein breach of the protective outer coating permits the degradation of the degradable intermediate layer by the solution or the water surfactant solution, thereby allowing the protective outer coating to be completely separated from the thermoplastic surface by removal of the degradable intermediate layer; and
    wherein the degradable intermediate layer comprises a polyanhydride represented by a structure of Formula I:

Formula I wherein R is consisted of a benzene or a heteroarene, and wherein n is 1 to about 100,000.

2. The thermoplastic material of claim 1, wherein the protective outer coating is adjacent to the degradable intermediate layer.

3. The thermoplastic material of claim 1, wherein the degradable intermediate layer is adjacent to the thermoplastic surface.

4. The thermoplastic material of claim 1, wherein the protective outer coating is adjacent to the degradable intermediate layer and the degradable intermediate layer is adjacent to the thermoplastic surface.

5. The thermoplastic material of claim 1, wherein the degradable intermediate layer further comprises an additional polyanhydride represented by a structure of Formula I:

Formula I wherein R is an aliphatic group, and wherein n is 1 to about 100,000.

6. The thermoplastic material of claim 5, wherein the aliphatic group is selected from the group consisting of: a $C_{1-10}$ alkane, a $C_{1-10}$ alkene, a $C_{1-10}$ alkyne, a $C_{3-10}$ cycloalkyl, and combinations thereof.

7. The thermoplastic material of claim 5, wherein the thermoplastic material is part of an automotive part, an electrical or an electronic equipment.

8. The thermoplastic material of claim 5, wherein the aliphatic group is straight chained.

9. The thermoplastic material of claim 5, wherein the aliphatic group is branched.

10. The thermoplastic material of claim 1, wherein the thermoplastic surface comprises at least one of: acrylonitrile butadiene styrene, acrylic, celluloid, cellulose acetate, cyclic olefin copolymer, ethylene-vinyl acetate, ethylene vinyl alcohol, efluoroplastics, ionomers, an acrylic-polyvinyl chloride alloy, liquid crystal polymer, polyoxymethylene, polyacrylates, polyacrylonitrile, polyamide, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester, polyethylene, polyetheretherketone, polyetherketoneketone, polyetherimide, polyethersulfone, chlorinated polyethylene, polyimide, polylactic acid, polymethylpentene, polyphenylene oxide, polyphenylene sulfide, polyphthalamide, polypropylene, polystyrene, poly sulfone, polytrimethylene terephthalate, polyurethane, polyvinyl acetate, polyvinyl chloride, polyvinylidene chloride, styrene-acrylonitrile, and combinations thereof.

11. The thermoplastic material of claim 1, wherein the the heteroarene is insoluble in organic solvents.

* * * * *

UNITED STATES PATENT AND TRADEMARK OFFICE
CERTIFICATE OF CORRECTION

PATENT NO. : 9,683,106 B2
APPLICATION NO. : 13/816702
DATED : June 20, 2017
INVENTOR(S) : Buker Page 1 of 1

It is certified that error appears in the above-identified patent and that said Letters Patent is hereby corrected as shown below:

In the Claims

In Column 14, Line 16, in Claim 11, delete "wherein the the" and insert -- wherein the --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*